United States Patent
White et al.

(10) Patent No.: US 11,347,574 B2
(45) Date of Patent: May 31, 2022

(54) SYSTEMS AND METHODS FOR PROCESSING SOFTWARE APPLICATION NOTIFICATIONS

(71) Applicant: Citrix Systems, Inc., Fort Lauderdale, FL (US)

(72) Inventors: Jeremy White, Fort Lauderdale, FL (US); Ted Harwood, Highland Beach, FL (US); Wellington Goncalves, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 40 days.

(21) Appl. No.: 16/919,451

(22) Filed: Jul. 2, 2020

(65) Prior Publication Data

US 2022/0004384 A1 Jan. 6, 2022

(51) Int. Cl.
| | |
|---|---|
| *G06F 11/00* | (2006.01) |
| *G06F 11/07* | (2006.01) |
| *G06F 8/71* | (2018.01) |
| *G06F 9/22* | (2006.01) |
| *G06F 11/30* | (2006.01) |

(52) U.S. Cl.
CPC .......... *G06F 11/0775* (2013.01); *G06F 8/71* (2013.01); *G06F 9/223* (2013.01); *G06F 11/0793* (2013.01); *G06F 11/302* (2013.01); *G06F 11/3068* (2013.01)

(58) Field of Classification Search
CPC ........ G06F 8/71; G06F 9/223; G06F 11/0775; G06F 11/0793; G06F 11/302; G06F 11/3068
See application file for complete search history.

(56) References Cited

U.S. PATENT DOCUMENTS

| | | | |
|---|---|---|---|
| 8,650,320 B1 | 2/2014 | Merrick et al. | |
| 9,547,579 B1 * | 1/2017 | Shen | G06F 11/36 |
| 2003/0167406 A1 * | 9/2003 | Beavers | G06F 11/0709 726/22 |
| 2018/0285250 A1 * | 10/2018 | Helsley | G06F 11/34 |
| 2019/0340048 A1 * | 11/2019 | Brown | G06F 11/0751 |
| 2021/0133015 A1 * | 5/2021 | Agarwal | G06F 16/2455 |

FOREIGN PATENT DOCUMENTS

WO   2009/070412 A1   6/2009

OTHER PUBLICATIONS

Sep. 21, 2021—(WO) International Search Report and Written Opinion—App PCT/US2021/039657.

* cited by examiner

*Primary Examiner* — Joshua P Lottich
(74) *Attorney, Agent, or Firm* — Banner & Witcoff, Ltd.

(57) ABSTRACT

Methods and systems for managing notifications relating to execution of microservices are described herein. A format of notifications relating to execution of a plurality of microservices may be defined. The format may provide that all notifications generated based on the format comprise code. The code may indicate, for example, an identity of one of a plurality of microservices, a version of the code, an occurrence of an issue in execution of the one of the plurality of microservices, and/or one or more scripts which may be executed to address an issue of the notification. Two or more notifications may be received, and the one or more notifications may be formatted based on the defined format. A third notification may be generated based on a comparison of the two or more notifications. The third notification may be transmitted to a computing device.

20 Claims, 8 Drawing Sheets

SYSTEMS AND METHODS FOR PROCESSING SOFTWARE APPLICATION NOTIFICATIONS

FIELD

Aspects described herein generally relate to computer networking, computer and hardware and software related thereto. More specifically, one or more aspects describe herein provide devices and techniques for processing software application notifications.

BACKGROUND

Software applications, such as microservices, may be configured to generate output relating to their operations. Such output may include notifications (e.g., alerts) about the execution of the software applications. For example, a microservice configured to download and store content on a hard drive may cause generation (e.g., through a monitoring tool) of an alert message responsive to a determination that the hard drive is full or nearly full. As another example, a software application may cause a notification to appear that indicates that a task has completed. Organizations may use tools, such as software applications, to generate, monitor, and/or analyze such notifications. For example, a software tool may be configured to receive the notifications and display them in a user interface.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

A Site Reliability Engineering (SRE) team may be tasked with using software applications to investigate notifications (e.g., alerts) generated by one or more applications, such as one or more microservices. This process can be extremely difficult: the SRE team may have to use multiple software applications (e.g., to investigate notifications from different microservices) and may have to deal with a significant quantity of issues/notifications from a variety of different sources and in a variety of different formats. This can have a significant impact on the SRE team's ability to quickly and efficiently address issues: for example, the sheer volume and variation of notifications might prevent the SRE team from identifying important notifications (e.g., early warnings of a crash) as compared to relatively less important notifications (e.g., alerts pertaining to storage device use).

This complexity can be made worse as new software applications are deployed. For example, a new microservice might generate notifications in a new format that is completely different from other already-deployed microservices. These different formats might cause inconsistencies in software applications and/or may introduce confusion into an notification monitoring workflow. For example, a large quantity of microservices all might have different notification format nuances, meaning that it may be difficult to analyze these notifications in a consistent manner.

To overcome limitations in the prior art described above, and to overcome other limitations that will be apparent upon reading and understanding the present specification, aspects described herein are directed towards standardizing notifications (e.g., microservice notification formats) and centralizing management of such standardized notifications.

As also described further herein, a computing device may receive a notification from a first computing device, the notification including content indicative of an issue in execution of a microservice of an application, and the notification being code in source code of the application and in a format different from that of other received notifications. The computing device may translate the content of the received notification into a translated notification that is in another format readable by a second computing device. The computing device may provide the translated notification to the second computing device for evaluation of the content of the received notification.

As described further herein, a computing device may define a format of notifications relating to execution of a plurality of microservices, wherein the format provides that all notifications generated based on the format comprise code that indicates: an identity of one of the plurality of microservices; a version of the code; and an occurrence of an issue in execution of the one of the plurality of microservices. The computing device may receive, from a second computing device, a first notification indicative of execution of a first microservice of the plurality of microservices, wherein the first notification is formatted based on the defined format, and wherein first source code of the first microservice includes the format. The computing device may receive, from the second computing device, a second notification indicative of subsequent execution of the first microservice, wherein the second notification is formatted based on the defined format. In this manner, the computing device may receive different notifications from different microservices, but the notifications may have the same format (e.g., the same schema) such that actions taken based on those notifications (e.g., generating and sending an alert to a monitoring tool) may be standardized. The computing device may generate a third notification based on a comparison of the first notification and the second notification. The computing device may transmit, to a third computing device, the third notification.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
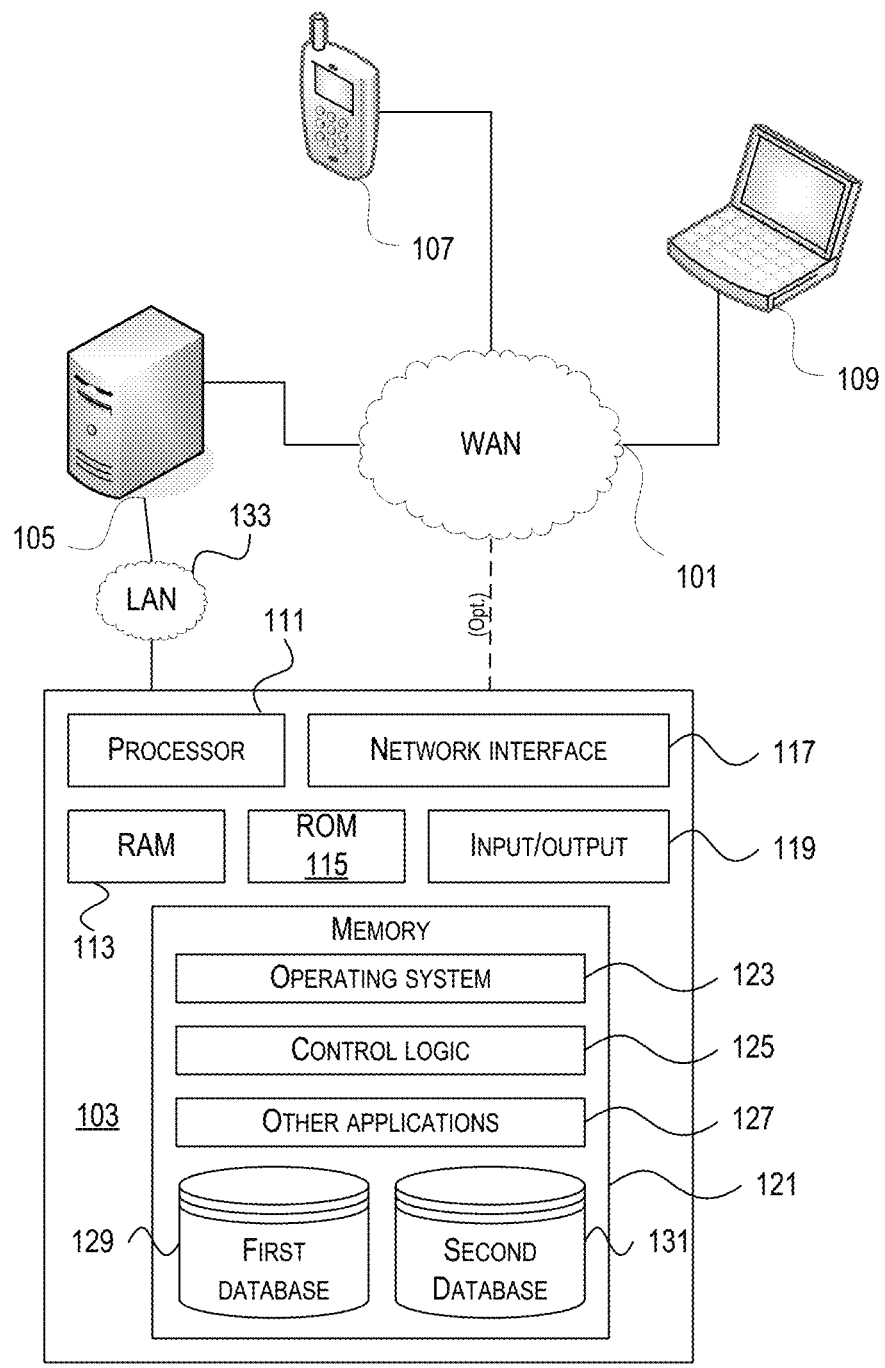
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Existing notification monitoring tools and notification methods are generally insufficient given the volume, complexity, and diversity of notifications which may be generated by software applications. For example, a large quantity of differently-formatted notifications may be received in rapid succession from a large variety of software applications. This can render tracking and addressing issues indicated by those notifications all but impossible. For example, some software applications capable of monitoring other software applications' notifications may be incapable of properly parsing and interpreting notifications in a particular format.

As a general introduction to the subject matter described in more detail below, aspects described herein are directed towards processing of software application notifications (e.g., notification management techniques). Applications, such as microservices, may cause the generation of notifications during execution of the applications. For example, a microservice might transmit notifications about its execution status which may cause generation of an alert indicating that a quantity of memory use has exceeded a predefined threshold, a notification indicating that a storage device is unavailable, or the like. Monitoring applications may be configured to receive, store, and/or analyze these notifications and may, e.g., generate alerts based on the notifications. For example, a monitoring application may collect notifications from multiple microservices for analysis. But these notifications can all vary wildly: the notifications may all have different formats, might pertain to different levels of severity of an issue, and may otherwise be difficult to manage. For example, a plurality of microservices might generate hundreds, if not multiple thousands, of notifications per day, many in completely different formats, though some of the notifications might be interrelated in various ways. Managing and reacting to these notifications (e.g., determining whether one or more notifications merit alerting an administrator) can be extremely difficult, even with the filtering and collection tools available through monitoring applications because of the sheer number of notifications to be reviewed and addressed. In other words, existing technologies cannot be sufficiently scaled to handle the number of notifications generated during execution of complex software applications without significant increases in costs of computing infrastructure and other resources to do so.

Indeed, software applications are generally ill-equipped to handle the deployment of large quantities of microservices, as in many cases these software applications only handle specific formats of notifications from a relatively finite quantity of microservices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2A:
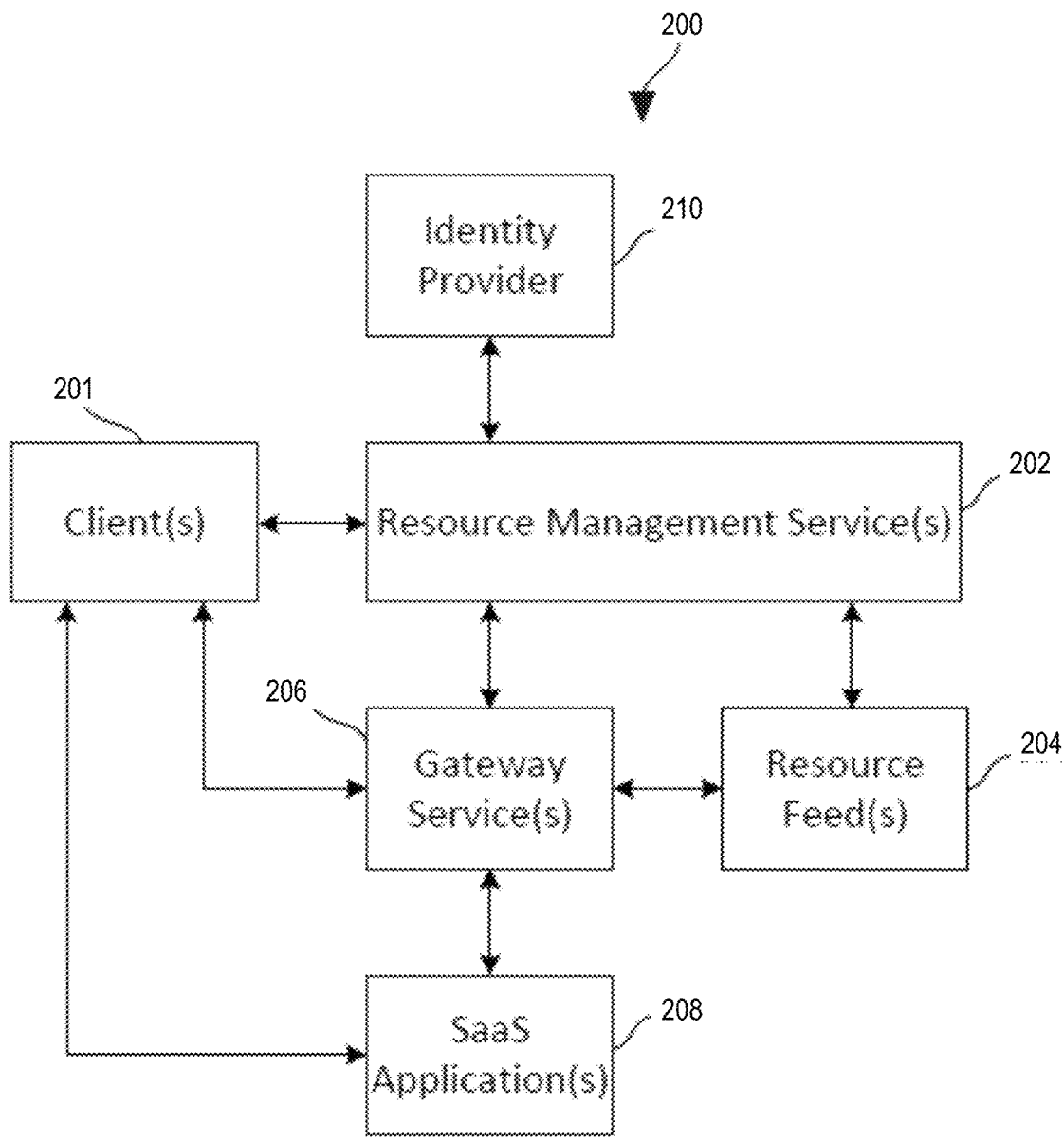
FIG. 2A is a block diagram of an example system in which resource management services may manage and streamline access by clients to resource feeds (via one or more gateway services) and/or software-as-a-service (SaaS) applications.

FIG. 2A is a block diagram of an example multi-resource access system 200 in which one or more resource management services 202 may manage and streamline access by one or more clients 201 to one or more resource feeds 204 (via one or more gateway services 206) and/or one or more software-as-a-service (SaaS) applications 208. In particular, the resource management service(s) 202 may employ an identity provider 210 to authenticate the identity of a user of a client 201 and, following authentication, identify one of more resources the user is authorized to access. In response to the user selecting one of the identified resources, the resource management service(s) 202 may send appropriate access credentials to the requesting client 201, and the client 201 may then use those credentials to access the selected resource. For the resource feed(s) 204, the client 201 may use the supplied credentials to access the selected resource via a gateway service 206. For the SaaS application(s) 208, the client 201 may use the credentials to access the selected application directly.

The client(s) 201 may be any type of computing devices capable of accessing the resource feed(s) 204 and/or the SaaS application(s) 208, and may, for example, include a variety of desktop or laptop computers, smartphones, tablets, etc. The resource feed(s) 204 may include any of numerous resource types and may be provided from any of numerous locations. In some embodiments, for example, the resource feed(s) 204 may include one or more systems or services for providing virtual applications and/or desktops to the client(s) 201, one or more file repositories and/or file sharing systems, one or more secure browser services, one or more access control services for the SaaS applications 208, one or more management services for local applications on the client(s) 201, one or more internet enabled devices or sensors, etc. The resource management service(s) 202, the resource feed(s) 204, the gateway service(s) 206, the SaaS application(s) 208, and the identity provider 210 may be located within an on-premises data center of an organization for which the multi-resource access system 200 is deployed, within one or more cloud computing environments, or elsewhere.

Figure 2B:
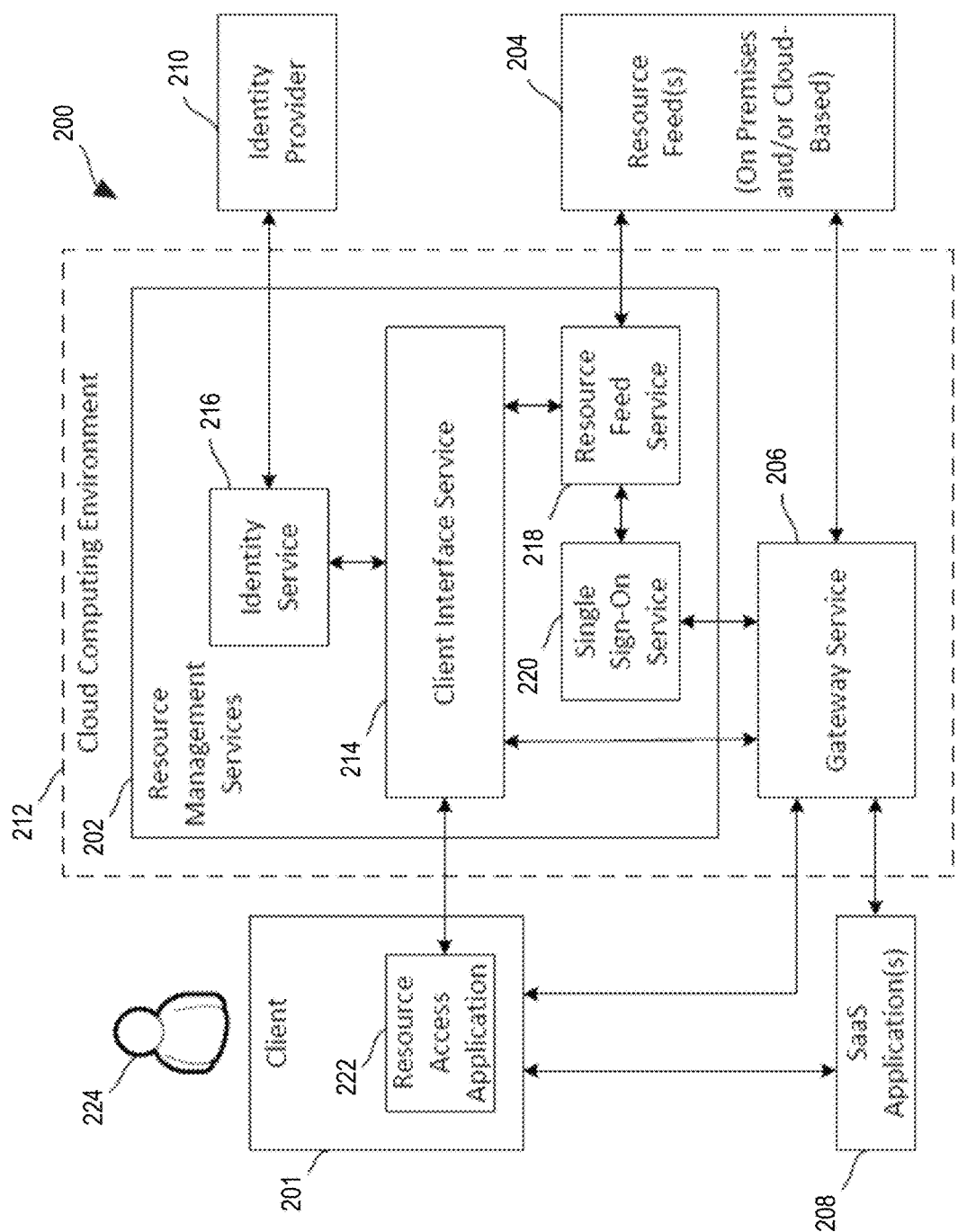
FIG. 2B is a block diagram showing an example implementation of the system shown in FIG. 2A in which various resource management services as well as a gateway service are located within a cloud computing environment.

FIG. 2B is a block diagram showing an example implementation of the multi-resource access system 200 shown in FIG. 2A in which various resource management services 202 as well as a gateway service 206 are located within a cloud computing environment 212. The cloud computing environment may, for example, include Microsoft Azure Cloud, Amazon Web Services, Google Cloud, or IBM Cloud. It should be appreciated, however, that in other implementations, one or more (or all) of the components of the resource management services 202 and/or the gateway service 206 may alternatively be located outside the cloud computing environment 212, such as within a data center hosted by an organization.

For any of the illustrated components (other than the client 201) that are not based within the cloud computing environment 212, cloud connectors (not shown in FIG. 2B) may be used to interface those components with the cloud computing environment 212. Such cloud connectors may, for example, run on Windows Server instances and/or Linux Server instances hosted in resource locations and may create a reverse proxy to route traffic between those resource locations and the cloud computing environment 212. In the illustrated example, the cloud-based resource management services 202 include a client interface service 214, an identity service 216, a resource feed service 218, and a single sign-on service 220. As shown, in some embodiments, the client 201 may use a resource access application 222 to communicate with the client interface service 214 as well as to present a user interface on the client 201 that a user 224 can operate to access the resource feed(s) 204 and/or the SaaS application(s) 208. The resource access application 222 may either be installed on the client 201, or may be executed by the client interface service 214 (or elsewhere in the multi-resource access system 200) and accessed using a web browser (not shown in FIG. 2B) on the client 201.

As explained in more detail below, in some embodiments, the resource access application 222 and associated components may provide the user 224 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 222 is launched or otherwise accessed by the user 224, the client interface service 214 may send a sign-on request to the identity service 216. In some embodiments, the identity provider 210 may be located on the premises of the organization for which the multi-resource access system 200 is deployed. The identity provider 210 may, for example, correspond to an on-premises Windows Active Directory. In such embodiments, the identity provider 210 may be connected to the cloud-based identity service 216 using a cloud connector (not shown in FIG. 2B), as described above. Upon receiving a sign-on request, the identity service 216 may cause the resource access application 222 (via the client interface service 214) to prompt the user 224 for the user's authentication credentials (e.g., user-name and password). Upon receiving the user's authentication credentials, the client interface service 214 may pass the credentials along to the identity service 216, and the identity service 216 may, in turn, forward them to the identity provider 210 for authentication, for example, by comparing them against an Active Directory domain. Once the identity service 216 receives confirmation from the identity provider 210 that the user's identity has been properly authenticated, the client interface service 214 may send a request to the resource feed service 218 for a list of subscribed resources for the user 224.

In other embodiments (not illustrated in FIG. 2B), the identity provider 210 may be a cloud-based identity service, such as a Microsoft Azure Active Directory. In such embodiments, upon receiving a sign-on request from the client interface service 214, the identity service 216 may, via the client interface service 214, cause the client 201 to be redirected to the cloud-based identity service to complete an authentication process. The cloud-based identity service may then cause the client 201 to prompt the user 224 to enter the user's authentication credentials. Upon determining the user's identity has been properly authenticated, the cloud-based identity service may send a message to the resource access application 222 indicating the authentication attempt was successful, and the resource access application 222 may then inform the client interface service 214 of the successfully authentication. Once the identity service 216 receives confirmation from the client interface service 214 that the user's identity has been properly authenticated, the client interface service 214 may send a request to the resource feed service 218 for a list of subscribed resources for the user 224.

The resource feed service 218 may request identity tokens for configured resources from the single sign-on service 220. The resource feed service 218 may then pass the feed-specific identity tokens it receives to the points of authentication for the respective resource feeds 204. The resource feeds 204 may then respond with lists of resources configured for the respective identities. The resource feed service 218 may then aggregate all items from the different feeds and forward them to the client interface service 214, which may cause the resource access application 222 to present a list of available resources on a user interface of the client 201. The list of available resources may, for example, be presented on the user interface of the client 201 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 201, and/or one or more SaaS applications 208 to which the user 224 has subscribed. The lists of local applications and the SaaS applications 208 may, for example, be supplied by resource feeds 204 for respective services that manage which such applications are to be made available to the user 224 via the resource access application 222. Examples of SaaS applications 208 that may be managed and accessed as described herein include Microsoft Office 365 applications, SAP SaaS applications, Workday applications, etc.

For resources other than local applications and the SaaS application(s) 208, upon the user 224 selecting one of the listed available resources, the resource access application 222 may cause the client interface service 214 to forward a request for the specified resource to the resource feed service 218. In response to receiving such a request, the resource feed service 218 may request an identity token for the corresponding feed from the single sign-on service 220. The resource feed service 218 may then pass the identity token received from the single sign-on service 220 to the client interface service 214 where a launch ticket for the resource may be generated and sent to the resource access application 222. Upon receiving the launch ticket, the resource access application 222 may initiate a secure session to the gateway service 206 and present the launch ticket. When the gateway service 206 is presented with the launch ticket, it may initiate a secure session to the appropriate resource feed and present the identity token to that feed to seamlessly authenticate the user 224. Once the session initializes, the client 201 may proceed to access the selected resource.

When the user 224 selects a local application, the resource access application 222 may cause the selected local application to launch on the client 201. When the user 224 selects a SaaS application 208, the resource access application 222 may cause the client interface service 214 to request a one-time uniform resource locator (URL) from the gateway service 206 as well a preferred browser for use in accessing the SaaS application 208. After the gateway service 206 returns the one-time URL and identifies the preferred browser, the client interface service 214 may pass that information along to the resource access application 222. The client 201 may then launch the identified browser and initiate a connection to the gateway service 206. The gateway service 206 may then request an assertion from the single sign-on service 220. Upon receiving the assertion, the gateway service 206 may cause the identified browser on the client 201 to be redirected to the logon page for identified SaaS application 208 and present the assertion. The SaaS may then contact the gateway service 206 to validate the assertion and authenticate the user 224. Once the user has been authenticated, communication may occur directly between the identified browser and the selected SaaS application 208, thus allowing the user 224 to use the client 201 to access the selected SaaS application 208.

In some embodiments, the preferred browser identified by the gateway service 206 may be a specialized browser embedded in the resource access application 222 (when the resource access application 222 is installed on the client 201) or provided by one of the resource feeds 204 (when the resource access application 222 is located remotely), e.g., via a secure browser service. In such embodiments, the SaaS applications 208 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 201 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 204) for assessment of its security risk by a web filtering service. For approved URLs, the specialized browser may be permitted to access the link. For suspicious links, however, the web filtering service may have the client interface service 214 send the link to a secure browser service, which may start a new virtual browser session with the client 201, and thus allow the user to access the potentially harmful linked content in a safe environment.

In some embodiments, in addition to or in lieu of providing the user 224 with a list of resources that are available to be accessed individually, as described above, the user 224 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 201 to notify a user 224 of something that requires the user's attention (e.g., approval of an expense report, new course available for registration, etc.).

Figure 2C:
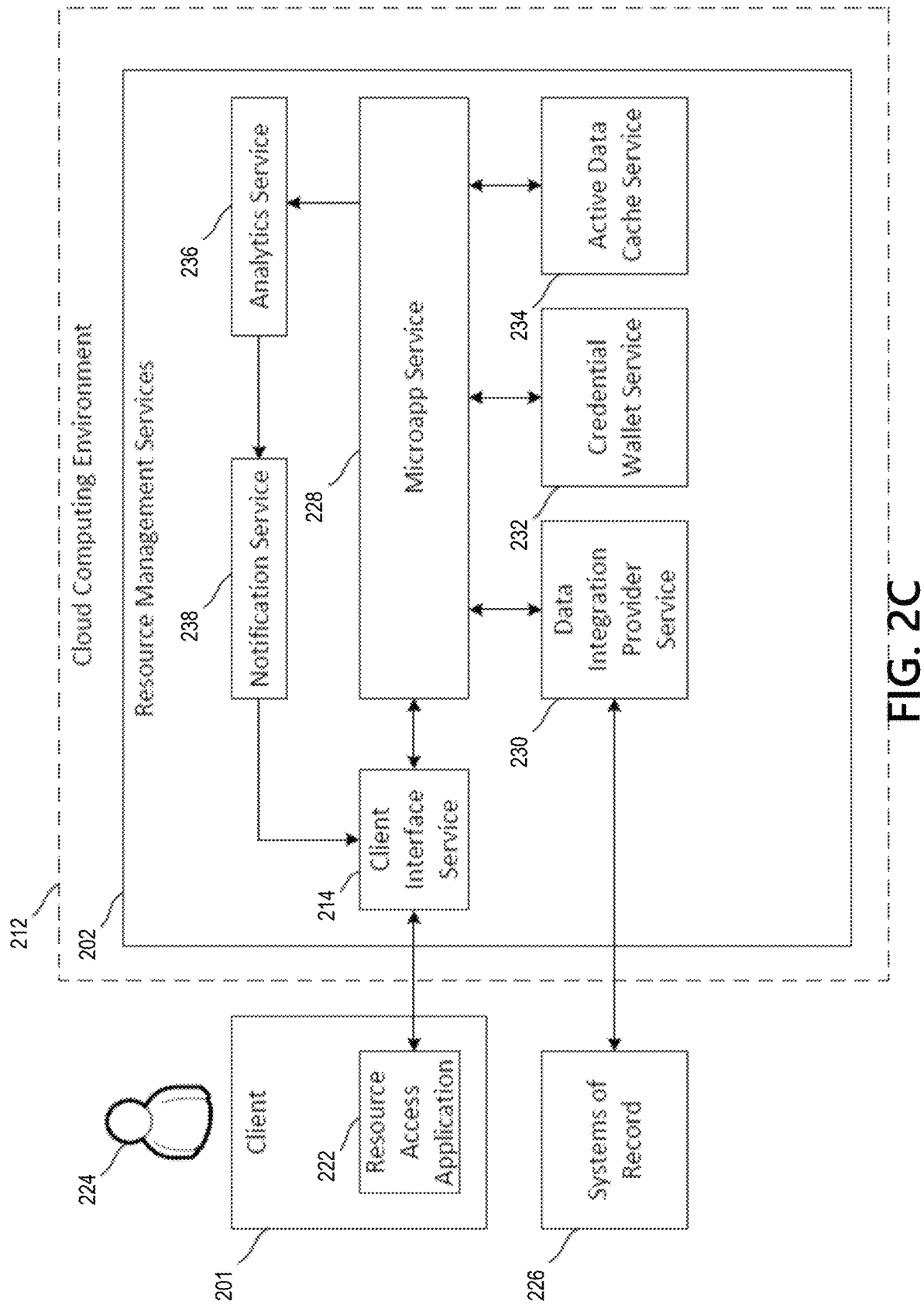
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 226 labeled "systems of record," and further in which several different services are included within the resource management services block 202. As explained below, the services shown in FIG. 2C may enable the provision of a streamlined resource activity feed and/or notification process for a client 201. In the example shown, in addition to the client interface service 214 discussed above, the illustrated services include a microapp service 228, a data integration provider service 230, a credential wallet service 232, an active data cache service 234, an analytics service 236, and a notification service 238. In various embodiments, the services shown in FIG. 2C may be employed either in addition to or instead of the different services shown in FIG. 2B. Further, as noted above in connection with FIG. 2B, it should be appreciated that, in other implementations, one or more (or all) of the components of the resource management services 202 shown in FIG. 2C may alternatively be located outside the cloud computing environment 212, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 222 without having to launch the native application. The system shown in FIG. 2C may, for example, aggregate relevant notifications, tasks, and insights, and thereby give the user 224 a dynamic productivity tool. In some embodiments, the resource activity feed may be intelligently populated by utilizing machine learning and artificial intelligence (AI) algorithms. Further, in some implementations, microapps may be configured within the cloud computing environment 212, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 226 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 230, may, for example, support REST API, JSON, OData-JSON, and 6ML. As explained in more detail below, the data integration provider service 230 may also write back to the systems of record, for example, using OAuth2 or a service account.

In some embodiments, the microapp service 228 may be a single-tenant service responsible for creating the microapps. The microapp service 228 may send raw events, pulled from the systems of record 226, to the analytics service 236 for processing. The microapp service may, for example, periodically cause active data to be pulled from the systems of record 226.

In some embodiments, the active data cache service 234 may be single-tenant and may store all configuration information and microapp data. It may, for example, utilize a per-tenant database encryption key and per-tenant database credentials.

In some embodiments, the credential wallet service 232 may store encrypted service credentials for the systems of record 226 and user OAuth2 tokens.

In some embodiments, the data integration provider service 230 may interact with the systems of record 226 to decrypt end-user credentials and write back actions to the systems of record 226 under the identity of the end-user. The write-back actions may, for example, utilize a user's actual account to ensure all actions performed are compliant with data policies of the application or other resource being interacted with.

In some embodiments, the analytics service 236 may process the raw events received from the microapp service 228 to create targeted scored notifications and send such notifications to the notification service 238.

Finally, in some embodiments, the notification service 238 may process any notifications it receives from the analytics service 236. In some implementations, the notification service 238 may store the notifications in a database to be later served in an activity feed. In other embodiments, the notification service 238 may additionally or alternatively send the notifications out immediately to the client 201 as a push notification to the user 224.

In some embodiments, a process for synchronizing with the systems of record 226 and generating notifications may operate as follows. The microapp service 228 may retrieve encrypted service account credentials for the systems of record 226 from the credential wallet service 232 and request a sync with the data integration provider service 230. The data integration provider service 230 may then decrypt the service account credentials and use those credentials to retrieve data from the systems of record 226. The data integration provider service 230 may then stream the retrieved data to the microapp service 228. The microapp service 228 may store the received systems of record data in the active data cache service 234 and also send raw events to the analytics service 236. The analytics service 236 may create targeted scored notifications and send such notifications to the notification service 238. The notification service 238 may store the notifications in a database to be later served in an activity feed and/or may send the notifications out immediately to the client 201 as a push notification to the user 224.

In some embodiments, a process for processing a user-initiated action via a microapp may operate as follows. The client 201 may receive data from the microapp service 228 (via the client interface service 214) to render information corresponding to the microapp. The microapp service 228 may receive data from the active data cache service 234 to support that rendering. The user 224 may invoke an action from the microapp, causing the resource access application 222 to send an action request to the microapp service 228 (via the client interface service 214). The microapp service 228 may then retrieve from the credential wallet service 232 an encrypted Oauth2 token for the system of record for which the action is to be invoked, and may send the action to the data integration provider service 230 together with the encrypted OAuth2 token. The data integration provider service 230 may then decrypt the OAuth2 token and write the action to the appropriate system of record under the identity of the user 224. The data integration provider service 230 may then read back changed data from the written-to system of record and send that changed data to the microapp service 228. The microapp service 228 may then update the active data cache service 234 with the updated data and cause a message to be sent to the resource access application 222 (via the client interface service 214) notifying the user 224 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistant through either the resource access application 222 or directly from another resource, such as Microsoft Teams. This feature may allow employees to work efficiently, stay organized, and deliver only the specific information they're looking for.

Figure 2D:
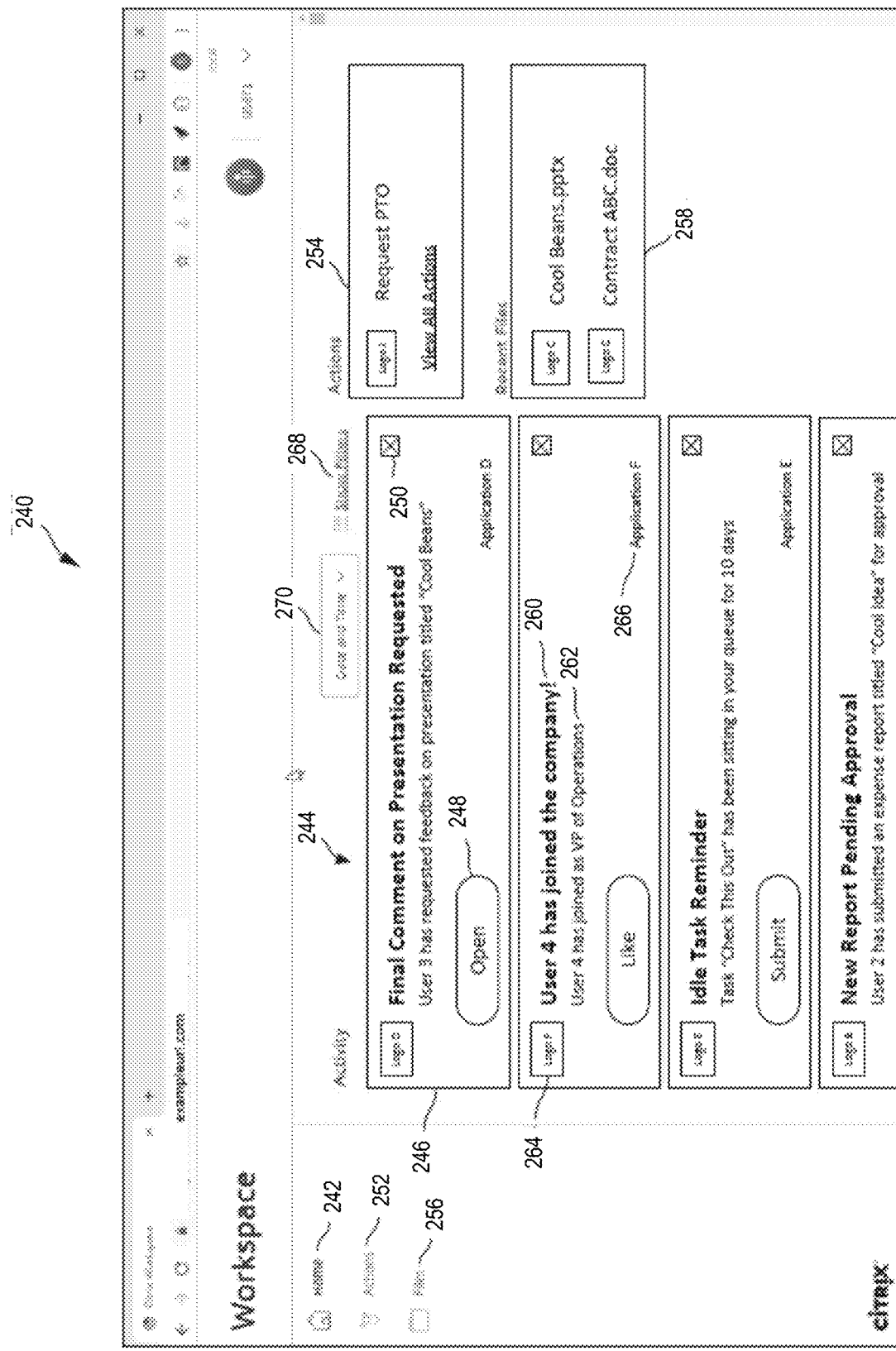
FIG. 2D shows how a display screen may appear when an intelligent activity feed feature of a multi-resource management system, such as that shown in FIG. 2C, is employed.

FIG. 2D shows how a display screen 240 presented by a resource access application 222 (shown in FIG. 2C) may appear when an intelligent activity feed feature is employed and a user is logged on to the system. Such a screen may be provided, for example, when the user clicks on or otherwise selects a "home" user interface element 242. As shown, an activity feed 244 may be presented on the screen 240 that includes a plurality of notifications 246 about respective events that occurred within various applications to which the user has access rights. An example implementation of a system capable of providing an activity feed 244 like that shown is described above in connection with FIG. 2C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 246 to the user concerning actions that the user can take relating to such events. As shown in FIG. 2D, in some implementations, the notifications 246 may include a title 260 and a body 262, and may also include a logo 264 and/or a name 266 of the system or record to which the notification 246 corresponds, thus helping the user understand the proper context with which to decide how best to respond to the notification 246. In some implementations, one of more filters may be used to control the types, date ranges, etc., of the notifications 246 that are presented in the activity feed 244. The filters that can be used for this purpose may be revealed, for example, by clicking on or otherwise selecting the "show filters" user interface element 268. Further, in some embodiments, a user interface element 270 may additionally or alternatively be employed to select a manner in which the notifications 246 are sorted within the activity feed. In some implementations, for example, the notifications 246 may be sorted in accordance with the "date and time" they were created (as shown for the element 270 in FIG. 2D) and/or an "application" mode (not illustrated) may be selected (e.g., using the element 270) in which the notifications 246 may be sorted by application type.

When presented with such an activity feed 244, the user may respond to the notifications 246 by clicking on or otherwise selecting a corresponding action element 248 (e.g., "Approve," "Reject," "Open," "Like," "Submit," etc.), or else by dismissing the notification, e.g., by clicking on or otherwise selecting a "close" element 250. As explained in connection with FIG. 2C below, the notifications 246 and corresponding action elements 248 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 246 (e.g., in a separate, pop-up window corresponding to the microapp) by clicking on or otherwise selecting a portion of the notification 246 other than one of the user-interface elements 248, 250. In some embodiments, the user may additionally or alternatively be able to select a user interface element either within the notification 246 or within a separate window corresponding to the microapp that allows the user to launch the native application to which the notification relates and respond to the event that prompted the notification via that native application rather than via the microapp. In addition to the event-driven actions accessible via the action elements 248 in the notifications 246, a user may alternatively initiate microapp actions by selecting a desired action, e.g., via a drop-down menu accessible using the "action" user-interface element 252 or by selecting a desired action from a list 254 of recently and/or commonly used microapp actions. As shown, the user may also access files (e.g., via a Citrix ShareFile™ platform) by selecting a desired file, e.g., via a drop-down menu accessible using the "files" user interface element 256 or by selecting a desired file from a list 258 of recently and/or commonly used files.

Although not shown in FIG. 2D, it should be appreciated that, in some implementations, additional resources may also be accessed through the screen 240 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 2D provides significant benefits, as it allows a user to respond to application-specific events generated by disparate systems of record without needing to navigate to, launch, and interface with multiple different native applications.

Notification Processing

Figure 3:
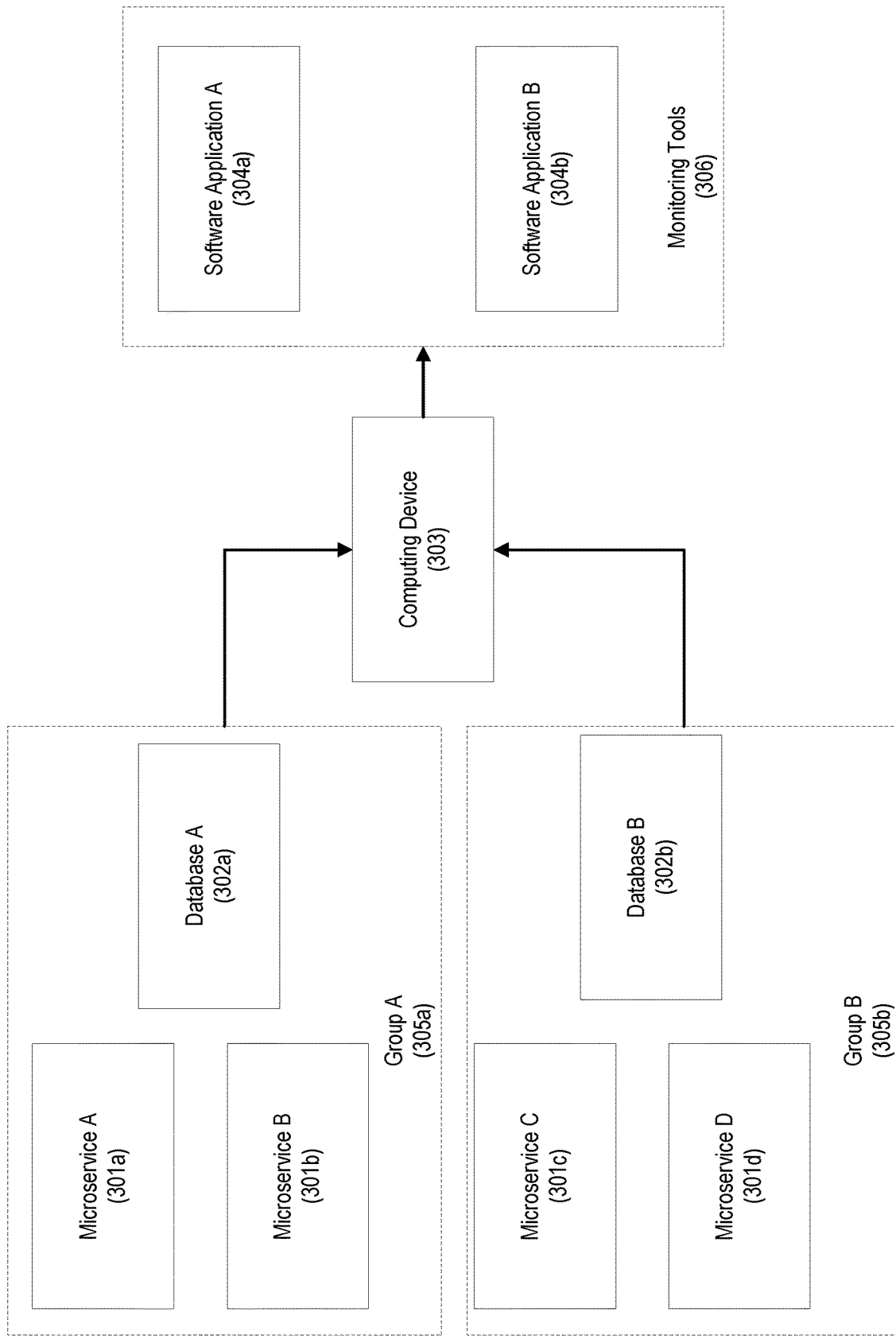
FIG. 3 depicts an illustrative computer system architecture software applications configured to process notifications.

FIG. 3 shows a system comprising microservices and software applications. Group A 305a may comprise microservice A 301a, microservice B 301b, and a database 302a. Group B 305b may comprise microservice C 301c, microservice D 301d, and a database B 302b. Group A 305a and group B 305b may be communicatively coupled (e.g., via one or more networks) to a computing device 303, which may be additionally and/or alternatively referred to as a server or a central monitoring device. The computing device 303 may be communicatively connected to monitoring tools 306, such as a software application A 304a and a software application B 304b.

The groups shown in FIG. 3, such as the group A 305a and group B 305b, are presented for convenience of discussion and do not correspond to any particular hardware or software. That said, in some examples, the groups may correspond to different logical divisions between microservices. For example, the group A 305a may correspond to a first portion of a larger application, whereas the group B 305b may correspond to a second portion of the larger application. As another example, the group A 305a may correspond to a first portion of an organization (e.g., an e-mail server), whereas the group B 305b may correspond to a second portion of an organization (e.g., a firewall).

Software applications, such as the microservice A 301a, the microservice B 301b, microservice C 301c, the microservice D 301d, the software application A 304a, and/or the software application B 304b may be any type of application or part of an application which may execute on one or more computing devices, such as one or more of the components 103, 105, 107, and/or 109 or the clients 201. Microservices may be divided parts of an application such that, for example, the microservice A 301a and the microservice B 301b may collectively be referred to as an application. Microservices may comprise compiled source code. For example, the microservice A 301a may be an executable file that has been compiled based on source code developed for a given software application. The microservices may perform different tasks, and two microservices may perform the same or a similar task. For example, both the microservice A 301a and the microservice D 301d may be configured to authenticate users to access computing resources (e.g., a service provider or web application). Two or more microservices may be related. For example, the microservice A 301a may be configured to authenticate users to access computing resources, whereas the microservice B 301b may be configured to provide those resources to a user after the microservice A 301a has authenticated the user.

Microservices may be configured to cause the generation of notifications (e.g., alert messages) during or otherwise related to execution of the microservices. For example, a microservice may transmit the notification itself, and/or may cause another application (e.g., an operating system of a computing device executing the microservice) to transmit the notification. Notifications may be any information about execution of one or more microservices. A notification may relate to, for example, an operating status of a microservice, an operating status of a computing device executing the microservice, an error of the microservice, or the like. For example, the microservice A 301a may cause generation of a notification when a storage device used by the microservice A 301a is nearly full. Such notifications may be generated upon a trigger (e.g., the microservice A 301a detecting that the storage device is nearly full) and/or periodically (e.g., the microservice A 301a periodically reporting a status of the storage device). A notification may be transmitted to the computing device 303 via a network, such as the WAN 101.

The microservices may be all or portions of the applications discussed with reference to FIGS. 2A-2D. For example, the microservices may execute on one or more of the clients 201, and/or may be all or portions of the SaaS applications 208. As another example, the computing device 303 may one or more of the devices depicted in FIGS. 2A-2D, such as the clients 201.

As will be described in further detail with respect to FIG. 4, notifications (e.g., alerts) relating to the execution of microservices may be formatted based on a defined format (e.g., a schema), such as a format stored in the microservices (e.g., included in the source code of the microservices). The format may provide that all notifications generated based on the format comprise code, such as code in an Extensible Markup Language (XML) format. By formatting the notification as code, the notification may be transmitted as text, and may be both human- and machine-readable. Such code may indicate a variety of information about the notifications, such as an identity of the microservice generating the notification, a version of the code, information about an occurrence of an issue in execution of the microservice, or the like. For example, elements of a notification formatted as XML code may indicate different properties of the notification, such as a version of the notification, scripts which may be executed to address an issue indicated by the notification, and the like. As such, transmission of a notification to the computing device 303 may comprise sending the notification as code.

Notifications (e.g., alerts) relating to the execution of the microservices may be received and/or stored by database or repository, such as the database A 302a and/or the database B 302b. Each of the databases maybe associated with one or more microservices. For example, because the database A 302a is part of group A 305a, it may receive one or more notifications relating to microservice A 301a and/or microservice B 301b. Similarly, because the database B 302b is part of group B 305b, it may be associated with microservice C 301c and microservice D 301d. The databases need not be implemented. For example, the microservices may be configured to communicate directly with the computing device 303.

Databases, such as the database A 302a and/or the database B 302b, may be configured to transmit notifications (e.g., alert notifications) relating to microservices to the computing device 303. Transmission of the notifications from the databases to the computing device 303 may be as soon as the notifications are determined (e.g., received from the microservices, determined by querying a computing device executing the microservice) and/or on a periodic basis. For example, notifications may comprise indications of a priority value (e.g., on a scale of one to ten, with ten being the most important), and the databases may immediately transmit high-priority notifications (e.g., those with a priority value of nine or above) to the computing device 303, but may batch and periodically transmit lower-priority notifications (e.g., those with a priority value of eight or below) to the computing device 303. Databases may be used to store notifications for specific issues. For example, the database A 302a may be used to store all notifications pertaining to storage device use.

The computing device 303 may be configured to receive notifications from the microservices, such as the microservice A 301a, the microservice B 301b, microservice C 301c, and/or microservice D 301d. The computing device 303 may additionally and/or alternatively receive such notifications from databases, such as the database A 302a and/or the database B 302b, computing devices, and/or other applications. The notifications may be received over a network, such as the WAN 101. The computing device may send data, such as information associated with received notifications and/or notifications generated based on the received notifications, to the monitoring tools 306 and via the network. In this manner, the computing device 303 may advantageously collect, correlate, and otherwise simplify the multitude of notifications received that relate to the microservices. Steps which may be performed by the computing device 303 are discussed in more detail with respect to FIG. 4. As such, notifications (e.g., alerts) may be received by the computing device 303 directly or indirectly. Microservices, such as the microservice A 301a, may transmit notifications to the computing device 303. In such a case, the notifications need not be alerts, but may be, for example, an operating status of the microservice. As such, the microservices may periodically report, as notifications, information about execution of the microservice, which may be received by the computing device 303 and, as discussed further below, used to generate another notification (e.g., an alert). Microservices, such as the microservice A 301a, may additionally and/or alternatively transmit notifications to databases, such as the database A 302a and/or the database B 302b, and/or other software applications, which may generate second notifications for receipt by the computing device 303. In this manner, a variety of intermediary computing devices and/or processes may be between the microservices and the computing device 303. Though this process may add complexity, it may be desirable to avoid adding complexity to the notification generation processes of the microservices.

The monitoring tools 306, such as the software application A 304a and the software application B 304b, may be configured to monitor notifications (e.g., alert messages) from the microservices and provide information about such notifications to one or more users. Examples of the monitoring tools 306 may include the CloudWatch software application sold by Amazon.com, Inc. of Seattle, Wash., the Splunk software application sold by Splunk Inc. of San Francisco, Calif., the Azure Monitor software application sold by Microsoft Corporation of Redmond, Wash., and Elastic software application developed by Elastic NV of Amsterdam, The Netherlands. The monitoring tools 306 may be configured to display, in a user interface, information about notifications. For example, the software application A 304*a* may be configured to display information about one or more notifications, such as a history of the one or more notifications.

Figure 4:
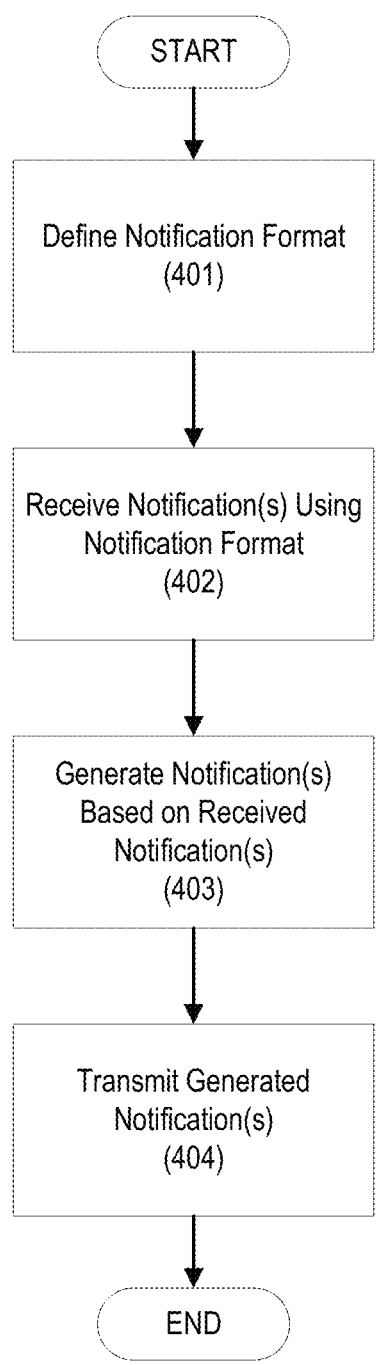
FIG. 4 is a flow chart depicting steps for processing notifications.

FIG. 4 is a flow chart depicting steps for handling notifications (e.g., alert notifications). The steps shown in FIG. 4 may be performed by a computing device having one or more processors and memory storing instructions that, when executed by the one or more processors, cause performance of some or all of the steps of FIG. 4 (e.g., computing device 303).

In step 401, a notification (e.g., an alert) format may be defined. Defining the notification format may have numerous advantages. By defining a notification format for multiple microservices, the need for special treatment of notifications (and, e.g., special training of individuals within an organization) is lessened. Having a single way to define notifications across an organization may also make it relatively easy for teams within a large organization to share notifications. Moreover, as the notification standard may be defined in advance, moving notifications from one software application to another (or even to a cloud provider) may be easier than if many notifications have varying formats.

The notification (e.g., the alert message) may be defined by, e.g., the computing device 303. For example, a user may use a user interface of the computing device 303 to specify organizational needs (e.g., to maintain storage space at all times), and thereby cause the computing device to generate a notification format based on those organizational needs (e.g., a notification format that indicates that all storage-related notifications are high priority). The notification format may provide that all notifications generated based on the format comprise code. The notification format may be configured to be part of the source code of one or more microservices, such that the microservices generate notifications in accordance with the format. The notification format may be stored and/or otherwise be maintained by the microservices, such as the microservice A 301*a*, the microservice B 301*b*, microservice C 301*c*, and/or the microservice D 301*d*. For example, the notification format may be stored in the source code of a microservice and compiled along with the microservice.

The format of notifications (e.g., the format of alerts) may provide that notifications generated by the microservices comprise particular information. For example, a notification format may require that notifications be generated in an XML format comprising five elements, each providing different types of information about the notification. Such information may comprise an identity of the microservice associated with the notification. In this manner, the microservice may be identified as compared to other microservices which may be associated with the same or similar notifications. Such information may comprise a version of the code, such as a version of the source code of the microservice, a version of the notification format, or other version information. This information may be useful for analysis of a cause of the notification: for example, older source code may indicate a particular error. Moreover, version control may enable the determination of a complete history of one or more notifications, trace changes made to notifications (and, e.g., allow subsequent notifications to link back to previous notifications), may allow notifications to link to bug tracking tools, and may aid individuals in understanding the reasons for actions (e.g., remedial actions) taken in response to the notification. Such information may comprise an indication of an issue in execution of the microservice. That issue may, for example, be concerning resource use (e.g., CPU, memory, hard drive space, network bandwidth), security (e.g., an attempt at unauthorized access of the microservice), or the like. Such information may comprise information regarding one or more scripts (e.g., from a plurality of available scripts for execution) which may be executed to address an issue associated with the notification. This may advantageously allow recipients of the notification to quickly execute those scripts to remediate all or portions of the issue associated with the notification. Such information may comprise an indication of one or more previous notifications corresponding to an issue indicated by the notification. For example, the notification may be required to contain a number of times the notification was generated by the microservice, information regarding previous notifications potentially associated with the same issue, or the like.

One or more microservices may be compiled along with the notification format (e.g., the alert format). For example, a notification format may be defined in the source code of one or more microservices and/or may be compiled along with the one or more microservices. The notification format may comprise a notification template, and the notification template may be part of the one or more microservices. The notification format may be configured as a file or template, such that the notification format may easily be inserted into the source code of the one or more microservices. In this way, adoption of the notification format by a variety of developers and in a variety of microservices may be made easier. Moreover, anyone with access to the source code of a microservice may aid in defining the notifications. This may be particularly useful because the developers of a microservice are likely to have a deep knowledge of the range of notifications which may be generated by the microservice. Indeed, any computing device or individual with access to the source code would thereby have access to information about how notifications might be generated by the microservice and in accordance with the notification format.

In step 402, notifications (e.g., alert notifications) may be received. A notification may be received by the computing device 303 and from microservices, databases, and/or other computing devices and/or applications. The notifications may relate to one or more of the microservices. The notifications may be in accordance with the notification format defined in step 401. The notifications may be from the same or different microservices. For example, a first notification may be received that relates to the microservice A 301*a*, whereas a second notification may be received that relates to the microservice B 301*b*. The notifications may be received at the same or different times, and may relate to the same or different issues of a microservice. For example, two different notifications may be received that relate to two different microservices, and those two different notifications may both be are associated with the same issue (e.g., an issue with a storage device used by both microservices to store content). As another example, two different notifications may be received that both relate to the same microservice and both indicate different issues (e.g., a storage device issue and a network bandwidth issue). As another example, a first notification may indicate a first issue with performance of a first task by a first microservice, a second notification may indicate a second issue with performance of a second task by the first microservice, the first issue and the second issue may be different, and the first task and the second task may be different.

Multiple notifications (e.g., alerts) may be received based on execution of a microservice at different times. A first notification indicative of execution of a first microservice may be received. The first notification may be based on the notification format. A second notification indicative of subsequent execution of the first microservice may be received. The second notification may also be based on the notification format. The second notification may be an update to an issue indicated by the first notification. The first notification and the second notification may be compared and, based on the comparison, an execution trend of the microservice may be determined. For example, the first notification may indicate that CPU usage is at 90%, and the second notification may indicate that the CPU usage has risen to 95%.

In step 403 a notification (e.g., an alert message) may be generated based on the received notifications (e.g., the received alerts). A generated notification may detail, summarize, and/or otherwise relate to the received notifications. For example, if one hundred different notifications are received from microservices indicating an issue with a particular storage device, the generated notification may indicate that there is an issue with the storage device and may indicate that one hundred different notifications were received. The generated notification may thereby summarize, simplify, and/or detail received notifications, which may be voluminous, contradictory, and otherwise so convoluted as to be difficult for review by the monitoring tools 306.

Generating the notification (e.g., the alert message) may comprise translating the content of the received notifications (e.g., received alert messages) into a generated notification (e.g., a generated alert) into a second format different from the format determined in step 401. The second format may be indicative of an intended recipient of the generated notification or alert. For example, if a generated notification is intended for a particular software application of the monitoring tools 306, then the second format may be a format which complies with requirements of the particular software application. As such, generating the notification may comprise determining an identity of a second application (e.g., a software application) executing on a different computing device (e.g., a remote server or service provider). In this way, devices performing step 403, such as the computing device 303, may help simplify and translate potentially incompatible, voluminous, and/or otherwise complex notifications into notifications which may be readily received and used by any of the monitoring tools 306.

Generating the notification may be based on determining that two or more of the received notifications or notifications pertain to the same or a similar issue. For example, multiple notifications may be received which pertain to the same portion issue (e.g., CPU usage, memory usage, storage space usage, or the like). In this manner, the generated notification may summarize multiple notifications, such that the number of notifications transmitted (in step 404, as discussed below) is lessened.

As part of generating the notification (e.g., generating the alert), recommendations for improvements to the notification format may be determined. For example, it may be determined that a certain type of notification is commonly reported, such that additional information might be worthwhile to include in the notification format. If it is determined to automatically modify the notification format, the notification format may be re-defined, and, as described further below, such a notification format may be transmitted to one or more computing devices.

In step 404, the generated notification (e.g., the generated alert) may be transmitted to one or more computing devices, such as computing devices executing one or more of the monitoring tools 306. Transmitting a generated notification may comprise causing display of a history of notifications. For example, the generated notification may cause the one or more computing devices to display a user interface showing a trend of notifications over time, a record of past notifications associated with the same or a similar issue, user interface elements which may be interacted with to cause scripts to address the issues to execute, or the like. Transmitting the generated notification may further comprise transmitting recommendations to the notification format along with or separately from the generated notification. For example, a revised notification format may be transmitted to another computing device, along with a recommendation that the revised notification format be used by all microservices.

As part of transmitting the generated notification (e.g., the generated alert), one or more scripts which may be executed to address an issue of a notification may be executed, and/or information about such scripts may be transmitted to the one or more computing devices. For example, a notification may indicate that a storage device is nearly full, and a script configured to remove content from the storage device may be executed. Executing the one or more scripts may comprise causing one or more applications and/or computing devices to execute the scripts. For example, the computing device 303 may cause one or more automation tools to perform tasks based on a script defined by a notification. For example, in response to a notification relating to excessive processor use, one or more automation tools may be configured to close one or more programs using the processor so as to free up processor availability. As another example, in response to a notification relating to excessive storage space use on a storage device, one or more automation tools may be configured to delete one or more files on the storage device. As another example, the computing device 303 may transmit a script to a cloud service provider, and transmitting the script to the cloud service provider may cause the cloud service provider to execute the script.

Figure 5:
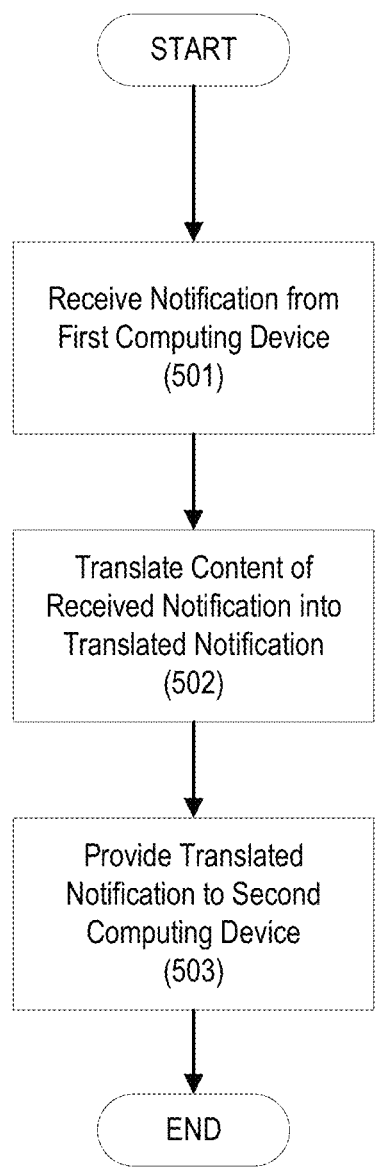
FIG. 5 is a flow chart depicting steps to translate notifications.

FIG. 5 is a flow chart showing steps which may be performed to translate a notification (e.g., an alert message). The steps shown in FIG. 5 may be performed by a computing device having one or more processors and memory storing instructions that, when executed by the one or more processors, cause the device to perform the steps of FIG. 5 (e.g., computing device 303).

In step 501, a notification (e.g., an alert message) may be received from a first computing device. A notification may be in the format described with respect to step 401 of FIG. 4, and the receipt of the notification may be the same or similar as described with respect to step 402 of FIG. 4.

In step 502, content of the received notification (e.g., the content of the received alert message) may be translated into a translated notification. This step may be the same or similar as described with respect to step 403 of FIG. 4. Translating the content of a received notification may comprise reformatting the content into a second format. The second format may be based on a second computing device. For example, a monitoring application of a second computing device may be identified, and the content may be translated based on a format that corresponds to the monitoring application identified.

Translation of the received notification (e.g., the received alert message) into a translated notification may comprise generating multiple translated notifications. For example, a plurality of monitoring software applications may be used by an enterprise, and multiple translated notifications may be generated such that each monitoring software application of the plurality of monitoring software applications may receive a notification in a format that works best with the application. In this manner, notification information may be provided to a variety of software applications, rather than such tools being limited by only being able to receive notifications that were originally formatted for their use.

In step 503, the translated notification (e.g., the translated alert message) may be provided to a second computing device, such as a computing device executing a monitoring application. This step may be the same or similar as step 404 of FIG. 4. There may be one or more second computing devices executing a plurality of monitoring applications, and each of the plurality of monitoring applications may receive the same translated notification or may receive a different translated notification (e.g., a translated notification formatted based on formatting requirements associated with the particular monitoring application). As described with respect to step 404 of FIG. 4, providing the translated notification to the second computing device may comprise causing performance of one or more steps configured to remediate an issue indicated by the translated notification. For example, the second computing device may receive the translated notification and, in response, execute a script configured to remedy an issue indicated by the translated notification.

The following paragraphs (M1) through (M14) describe examples of methods that may be implemented in accordance with the present disclosure.

(M1) A method comprising defining, by a computing device, a format of alerts relating to execution of a plurality of microservices, wherein the format provides that all alerts generated based on the format comprise code that indicates: an identity of one of the plurality of microservices; a version of the code; and an occurrence of an issue in execution of the one of the plurality of microservices; receiving, by the computing device and from a second computing device, a first alert indicative of execution of a first microservice of the plurality of microservices, wherein the first alert is formatted based on the defined format, and wherein first source code of the first microservice includes the format; receiving, by the computing device and from the second computing device, a second alert indicative of subsequent execution of the first microservice, wherein the second alert is formatted based on the defined format; generating, by the computing device, a third alert based on a comparison of the first alert and the second alert; and transmitting, to a third computing device, the third alert (M2) A method may be performed as described in paragraph (M1) wherein the first alert comprises an associated with execution of the first microservice, and wherein the second alert comprises an update associated with the execution of the first microservice.

(M3) A method may be performed as described in any of paragraphs (M1) through (M2) wherein the format provides that all alerts generated based on the format comprise code further indicate: one or more scripts which may be executed to address an issue of the alert.

(M4) A method may be performed as described in any of paragraphs (M1) through (M3) further comprising: receiving, by the computing device and from a fourth computing device, a fourth alert indicative of execution of a second microservice of the plurality of microservices; and transmitting, to the third computing device and based on determining that the first alert, the second alert, and the third alert relate to a similar issue, an indication of the similar issue.

(M5) A method may be performed as described in any one of paragraphs (M1) through (M4) wherein generating the third alert comprises: determining one or more differences between the first alert and the second alert, wherein the third alert summarizes the one or more differences.

(M6) A method may be performed as described in any one of paragraphs (M1) through (M5) wherein generating the third alert comprises: determining a second format used by an application executing on the third computing device; and generating the third alert based on the second format.

(M7) A method may be performed as described in any one of paragraphs (M1) through (M6) wherein the first alert indicates a first issue with performance of a first task by the first microservice, wherein the second alert indicates a second issue with performance of a second task by the first microservice, wherein the first issue and second issue are different, and wherein the first task and second task are different.

(M8) A method comprising receiving, by a computing device, a notification from a first computing device, the notification including content indicative of an issue in execution of a microservice of an application, and the notification being code in source code of the application and in a format different from that of other received notifications; translating, by the computing device, the content of the received notification into a translated notification that is in another format readable by a second computing device; and providing, by the computing device, the translated notification to the second computing device for evaluation of the content of the received notification.

(M9) A method may be performed as described in paragraph (M8) wherein translating the content of the received notification into the another format readable by the second computing device comprises: determining, based on an identity of a second application executing on the second computing device, the another format.

(M10) A method may be performed as described in any one of paragraphs (M8) through (M9) wherein the format different from that of other received notifications provides that all notifications generated based on the format comprise code that indicates: an identity of the microservice; and a version of the code.

(M11) A method may be performed as described in any one of paragraphs (M8) through (M10) wherein translating the content of the received notification into the another format readable by the second computing device comprises: determining one or more previous notifications corresponding to the issue in execution of the microservice; and adding, to the translated notification, an indication of the one or more previous notifications.

(M12) A method may be performed as described in paragraph (M11) further comprising: causing display, by the second computing device, of a history of notifications that comprises the notification and the one or more previous notifications.

(M13) A method may be performed as described in any one of paragraphs (M11) through (M12) wherein determining the one or more previous notifications comprises: receiving, from one or more third computing devices, the one or more previous notifications.

(M14) A method may be performed as described in any one of paragraphs (M8) through (M13) further comprising: determining one or more scripts configured to address the issue in the execution of the microservice; and providing, to the second computing device, one or more identities of the one or more scripts.

The following paragraphs (A1) through (A14) describe examples of apparatuses that may be implemented in accordance with the present disclosure.

(A1) An apparatus comprising: one or more processors; and memory storing instructions that, when executed by the one or more processors, cause the apparatus to define a format of alerts relating to execution of a plurality of microservices, wherein the format provides that all alerts generated based on the format comprise code that indicates: an identity of one of the plurality of microservices; a version of the code; and an occurrence of an issue in execution of the one of the plurality of microservices; receive, from a second computing device, a first alert indicative of execution of a first microservice of the plurality of microservices, wherein the first alert is formatted based on the defined format, and wherein first source code of the first microservice includes the format; receive, from the second computing device, a second alert indicative of subsequent execution of the first microservice, wherein the second alert is formatted based on the defined format; generate a third alert based on a comparison of the first alert and the second alert; and transmit, to a third computing device, the third alert (A2) An apparatus as described in paragraph (A1) wherein the first alert comprises an associated with execution of the first microservice, and wherein the second alert comprises an update associated with the execution of the first microservice.

(A3) An apparatus as described in any of paragraphs (A1) through (A2) wherein the format provides that all alerts generated based on the format comprise code further indicate: one or more scripts which may be executed to address an issue of the alert.

(A4) An apparatus as described in any of paragraphs (A1) through (A3) wherein the instructions, when executed by the one or more processors, further cause the apparatus to: receive, from a fourth computing device, a fourth alert indicative of execution of a second microservice of the plurality of microservices; and transmit, to the third computing device and based on determining that the first alert, the second alert, and the third alert relate to a similar issue, an indication of the similar issue.

(A5) An apparatus as described in any one of paragraphs (A1) through (A4) wherein the instructions, when executed by the one or more processors, cause the apparatus to generate the third alert by: determining one or more differences between the first alert and the second alert, wherein the third alert summarizes the one or more differences.

(A6) An apparatus as described in any one of paragraphs (A1) through (A5) wherein the instructions, when executed by the one or more processors, cause the apparatus to generate the third alert by: determining a second format used by an application executing on the third computing device; and generating the third alert based on the second format.

(A7) An apparatus as described in any one of paragraphs (A1) through (A6) wherein the first alert indicates a first issue with performance of a first task by the first microservice, wherein the second alert indicates a second issue with performance of a second task by the first microservice, wherein the first issue and second issue are different, and wherein the first task and second task are different.

(A8) An apparatus comprising: one or more processors; and memory storing instructions that, when executed by the one or more processors, cause the apparatus to receive a notification from a first computing device, the notification including content indicative of an issue in execution of a microservice of an application, and the notification being code in source code of the application and in a format different from that of other received notifications; translate the content of the received notification into a translated notification that is in another format readable by a second computing device; and provide the translated notification to the second computing device for evaluation of the content of the received notification.

(A9) An apparatus as described in paragraph (A8) wherein the instructions, when executed by the one or more processors, cause the apparatus to translate the content of the received notification into the another format readable by the second computing device by: determining, based on an identity of a second application executing on the second computing device, the another format.

(A10) An apparatus as described in any one of paragraphs (A8) through (A9) wherein the format different from that of other received notifications provides that all notifications generated based on the format comprise code that indicates: an identity of the microservice; and a version of the code.

(A11) An apparatus as described in any one of paragraphs (A8) through (A10) wherein the instructions, when executed by the one or more processors, cause the apparatus to translate the content of the received notification into the another format readable by the second computing device by: determining one or more previous notifications corresponding to the issue in execution of the microservice; and adding, to the translated notification, an indication of the one or more previous notifications.

(A12) An apparatus as described in paragraph (A11) wherein the instructions, when executed by the one or more processors, further cause the apparatus to: cause display, by the second computing device, of a history of notifications that comprises the notification and the one or more previous notifications.

(A13) An apparatus as described in any one of paragraphs (A11) through (A12) wherein the instructions, when executed by the one or more processors, further cause the apparatus to determine the one or more previous notifications by: receiving, from one or more third computing devices, the one or more previous notifications.

(A14) An apparatus as described in any one of paragraphs (A8) through (A13) wherein the instructions, when executed by the one or more processors, further cause the apparatus to: determine one or more scripts configured to address the issue in the execution of the microservice; and provide, to the second computing device, one or more identities of the one or more scripts.

The following paragraphs (CRM1) through (CRM14) describe examples of computer-readable media that may be implemented in accordance with the present disclosure.

(CRM1) One or more non-transitory computer-readable media storing instructions that, when executed by one or more processors, cause an apparatus to define a format of alerts relating to execution of a plurality of microservices, wherein the format provides that all alerts generated based on the format comprise code that indicates: an identity of one of the plurality of microservices; a version of the code; and an occurrence of an issue in execution of the one of the plurality of microservices; receive, from a second computing device, a first alert indicative of execution of a first microservice of the plurality of microservices, wherein the first alert is formatted based on the defined format, and wherein first source code of the first microservice includes the format; receive, from the second computing device, a second alert indicative of subsequent execution of the first microservice, wherein the second alert is formatted based on the defined format; generate a third alert based on a comparison of the first alert and the second alert; and transmit, to a third computing device, the third alert (CRM2) One or more non-transitory computer-readable media as described in paragraph (CRM1) wherein the first alert comprises an associated with execution of the first microservice, and wherein the second alert comprises an update associated with the execution of the first microservice.

(CRM3) One or more non-transitory computer-readable media as described in any of paragraphs (CRM1) through (CRM2) wherein the format provides that all alerts generated based on the format comprise code further indicate: one or more scripts which may be executed to address an issue of the alert.

(CRM4) One or more non-transitory computer-readable media as described in any of paragraphs (CRM1) through (CRM3) wherein the instructions, when executed by the one or more processors, further cause the apparatus to: receive, from a fourth computing device, a fourth alert indicative of execution of a second microservice of the plurality of microservices; and transmit, to the third computing device and based on determining that the first alert, the second alert, and the third alert relate to a similar issue, an indication of the similar issue.

(CRM5) One or more non-transitory computer-readable media as described in any one of paragraphs (CRM1) through (CRM4) wherein the instructions, when executed by the one or more processors, cause the apparatus to generate the third alert by: determining one or more differences between the first alert and the second alert, wherein the third alert summarizes the one or more differences.

(CRM6) One or more non-transitory computer-readable media as described in any one of paragraphs (CRM1) through (CRM5) wherein the instructions, when executed by the one or more processors, cause the apparatus to generate the third alert by: determining a second format used by an application executing on the third computing device; and generating the third alert based on the second format.

(CRM7) One or more non-transitory computer-readable media as described in any one of paragraphs (CRM1) through (CRM6) wherein the first alert indicates a first issue with performance of a first task by the first microservice, wherein the second alert indicates a second issue with performance of a second task by the first microservice, wherein the first issue and second issue are different, and wherein the first task and second task are different.

(CRM8) One or more non-transitory computer-readable media storing instructions that, when executed by one or more processors, cause an apparatus to receive a notification from a first computing device, the notification including content indicative of an issue in execution of a microservice of an application, and the notification being code in source code of the application and in a format different from that of other received notifications; translate the content of the received notification into a translated notification that is in another format readable by a second computing device; and provide the translated notification to the second computing device for evaluation of the content of the received notification.

(CRM9) One or more non-transitory computer-readable media as described in paragraph (CRM8) wherein the instructions, when executed by the one or more processors, cause the apparatus to translate the content of the received notification into the another format readable by the second computing device by: determining, based on an identity of a second application executing on the second computing device, the another format.

(CRM10) One or more non-transitory computer-readable media as described in any one of paragraphs (CRM8) through (CRM9) wherein the format different from that of other received notifications provides that all notifications generated based on the format comprise code that indicates: an identity of the microservice; and a version of the code.

(CRM11) One or more non-transitory computer-readable media as described in any one of paragraphs (CRM8) through (CRM10) wherein the instructions, when executed by the one or more processors, cause the apparatus to translate the content of the received notification into the another format readable by the second computing device by: determining one or more previous notifications corresponding to the issue in execution of the microservice; and adding, to the translated notification, an indication of the one or more previous notifications.

(CRM12) One or more non-transitory computer-readable media as described in paragraph (CRM11) wherein the instructions, when executed by the one or more processors, further cause the apparatus to: cause display, by the second computing device, of a history of notifications that comprises the notification and the one or more previous notifications.

(CRM13) One or more non-transitory computer-readable media as described in any one of paragraphs (CRM11) through (CRM12) wherein the instructions, when executed by the one or more processors, further cause the apparatus to determine the one or more previous notifications by: receiving, from one or more third computing devices, the one or more previous notifications.

(CRM14) One or more non-transitory computer-readable media as described in any one of paragraphs (CRM8) through (CRM13) wherein the instructions, when executed by the one or more processors, further cause the apparatus to: determine one or more scripts configured to address the issue in the execution of the microservice; and provide, to the second computing device, one or more identities of the one or more scripts.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
defining, by a computing device, a format of alerts relating to execution of a plurality of microservices, wherein the format provides that all alerts generated based on the format comprise code that indicates:
an identity of one of the plurality of microservices;
a version of the code; and
an occurrence of an issue in execution of the one of the plurality of microservices;
receiving, by the computing device and from a second computing device, a first alert indicative of execution of a first microservice of the plurality of microservices, wherein the first alert is formatted based on the defined format, and wherein first source code of the first microservice includes the format;
receiving, by the computing device and from the second computing device, a second alert indicative of subsequent execution of the first microservice, wherein the second alert is formatted based on the defined format;
identifying, based on the first alert and the second alert, one or more computing resources identified, by the first alert and the second alert, to be associated with the issue in the execution of the one of the plurality of microservices;
identifying, based on the issue in the execution of the one of the plurality of microservices, one or more scripts configured to, when executed, modify an available quantity of the one or more computing resources;
generating, by the computing device, a third alert based on a comparison of the first alert and the second alert, wherein the third alert comprises an indication of the one or more scripts; and
transmitting, to a third computing device, the third alert, wherein the third alert is configured to cause the third computing device to execute the one or more scripts so as to modify the available quantity of the one or more computing resources.

2. The method of claim 1, wherein the first alert indicates execution of the first microservice, and wherein the second alert comprises an update associated with the execution of the first microservice.

3. The method of claim 1, wherein the format provides that all alerts generated based on the format comprise code further indicate:
at least one script which may be executed to address an issue of the alert.

4. The method of claim 1, further comprising:
receiving, by the computing device and from a fourth computing device, a fourth alert indicative of execution of a second microservice of the plurality of microservices; and
transmitting, to the third computing device and based on determining that the first alert, the second alert, and the third alert relate to a similar issue, an indication of the similar issue.

5. The method of claim 1, wherein generating the third alert comprises:
determining one or more differences between the first alert and the second alert, wherein the third alert summarizes the one or more differences.

6. The method of claim 1, wherein generating the third alert comprises:
determining a second format used by an application executing on the third computing device; and
generating the third alert based on the second format.

7. The method of claim 1, wherein the first alert indicates a first issue with performance of a first task by the first microservice, wherein the second alert indicates a second issue with performance of a second task by the first microservice, wherein the first issue and second issue are different, and wherein the first task and second task are different.

8. A computing device comprising:
one or more processors; and
memory storing instructions that, when executed by the one or more processors, cause the computing device to:
define a format of alerts relating to execution of a plurality of microservices, wherein the format provides that all alerts generated based on the format comprise code that indicates:
an identity of one of the plurality of microservices;
a version of the code; and
an occurrence of an issue in execution of the one of the plurality of microservices;
receive, from a second computing device, a first alert indicative of execution of a first microservice of the plurality of microservices, wherein the first alert is formatted based on the defined format, and wherein first source code of the first microservice includes the format;
receive, from the second computing device, a second alert indicative of subsequent execution of the first microservice, wherein the second alert is formatted based on the defined format;
identify, based on the first alert and the second alert, one or more computing resources identified, by the first alert and the second alert, to be associated with the issue in the execution of the one of the plurality of microservices;
identify, based on the issue in the execution of the one of the plurality of microservices, one or more scripts configured to, when executed, modify an available quantity of the one or more computing resources;
generate a third alert based on a comparison of the first alert and the second alert, wherein the third alert comprises an indication of the one or more scripts; and
transmit, to a third computing device, the third alert, wherein the third alert is configured to cause the third computing device to execute the one or more scripts so as to modify the available quantity of the one or more computing resources.

9. The computing device of claim 8, wherein the first alert indicates execution of the first microservice, and wherein the second alert comprises an update associated with the execution of the first microservice.

10. The computing device of claim 8, wherein the format provides that all alerts generated based on the format comprise code further indicate:
at least one script which may be executed to address an issue of the alert.

11. The computing device of claim 8, wherein the instructions, when executed by the one or more processors, further cause the computing device to:
receive, from a fourth computing device, a fourth alert indicative of execution of a second microservice of the plurality of microservices; and
transmit, to the third computing device and based on determining that the first alert, the second alert, and the third alert relate to a similar issue, an indication of the similar issue.

12. The computing device of claim 8, wherein the instructions, when executed by the one or more processors, further cause the computing device to generate the third alert by causing the computing device to:
determine one or more differences between the first alert and the second alert, wherein the third alert summarizes the one or more differences.

13. The computing device of claim 8, wherein the instructions, when executed by the one or more processors, further cause the computing device to generate the third alert by causing the computing device to:
determine a second format used by an application executing on the third computing device; and
generate the third alert based on the second format.

14. The computing device of claim 8, wherein the first alert indicates a first issue with performance of a first task by the first microservice, wherein the second alert indicates a second issue with performance of a second task by the first microservice, wherein the first issue and second issue are different, and wherein the first task and second task are different.

15. One or more computer-readable media storing instructions that, when executed by one or more processors of a computing device, cause the computing device to:
   define a format of alerts relating to execution of a plurality of microservices, wherein the format provides that all alerts generated based on the format comprise code that indicates:
      an identity of one of the plurality of microservices;
      a version of the code; and
      an occurrence of an issue in execution of the one of the plurality of microservices;
   receive, from a second computing device, a first alert indicative of execution of a first microservice of the plurality of microservices, wherein the first alert is formatted based on the defined format, and wherein first source code of the first microservice includes the format;
   receive, from the second computing device, a second alert indicative of subsequent execution of the first microservice, wherein the second alert is formatted based on the defined format;
   identify, based on the first alert and the second alert, one or more computing resources identified, by the first alert and the second alert, to be associated with the issue in the execution of the one of the plurality of microservices;
   identify, based on the issue in the execution of the one of the plurality of microservices, one or more scripts configured to, when executed, modify an available quantity of the one or more computing resources;
   generate a third alert based on a comparison of the first alert and the second alert, wherein the third alert comprises an indication of the one or more scripts; and
   transmit, to a third computing device, the third alert, wherein the third alert is configured to cause the third computing device to execute the one or more scripts so as to modify the available quantity of the one or more computing resources.

16. The computer-readable media of claim 15, wherein the first alert indicates execution of the first microservice, and wherein the second alert comprises an update associated with the execution of the first microservice.

17. The computer-readable media of claim 15, wherein the format provides that all alerts generated based on the format comprise code further indicate:
   at least one script which may be executed to address an issue of the alert.

18. The computer-readable media of claim 15, wherein the instructions, when executed by the one or more processors, further cause the computing device to:
   receive, from a fourth computing device, a fourth alert indicative of execution of a second microservice of the plurality of microservices; and
   transmit, to the third computing device and based on determining that the first alert, the second alert, and the third alert relate to a similar issue, an indication of the similar issue.

19. The computer-readable media of claim 15, wherein the instructions, when executed by the one or more processors, further cause the computing device to generate the third alert by causing the computing device to:
   determine one or more differences between the first alert and the second alert, wherein the third alert summarizes the one or more differences.

20. The computer-readable media of claim 15, wherein the instructions, when executed by the one or more processors, further cause the computing device to generate the third alert by causing the computing device to:
   determine a second format used by an application executing on the third computing device; and
   generate the third alert based on the second format.

* * * * *